(12) United States Patent
Marra et al.

(10) Patent No.: US 9,349,147 B2
(45) Date of Patent: May 24, 2016

(54) DISPLAYING CONTENT ITEMS RELATED TO A SOCIAL NETWORK GROUP ON A MAP

(75) Inventors: Gregory Matthew Marra, San Francisco, CA (US); Benjamin David Eidelson, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 199 days.

(21) Appl. No.: 13/286,986

(22) Filed: Nov. 1, 2011

(65) Prior Publication Data

US 2013/0111354 A1 May 2, 2013

(51) Int. Cl.
  *G06F 17/00* (2006.01)
  *G06Q 50/00* (2012.01)
  *G09B 29/00* (2006.01)
  *G06F 3/048* (2013.01)

(52) U.S. Cl.
  CPC ............... *G06Q 50/01* (2013.01); *G06F 3/048* (2013.01); *G09B 29/007* (2013.01)

(58) Field of Classification Search
  None
  See application file for complete search history.

(56) References Cited

U.S. PATENT DOCUMENTS

| | | | |
|---|---|---|---|
| 5,324,958 A | 6/1994 | Mead et al. | |
| 5,442,744 A | 8/1995 | Piech et al. | |
| 5,835,061 A | 11/1998 | Stewart | |
| 6,332,146 B1 | 12/2001 | Jebens et al. | |
| 6,332,149 B1 | 12/2001 | Warmus et al. | |
| 6,373,488 B1 | 4/2002 | Gasper et al. | |
| 6,389,181 B2 | 5/2002 | Shaffer et al. | |
| 6,449,639 B1 | 9/2002 | Blumberg | |
| 6,578,072 B2 | 6/2003 | Watanabe et al. | |
| 6,681,061 B2 | 1/2004 | Agata et al. | |
| 6,842,761 B2 | 1/2005 | Diamond et al. | |
| 6,883,146 B2 | 4/2005 | Prabhu et al. | |
| 6,950,989 B2 | 9/2005 | Rosenzweig et al. | |
| 7,020,848 B2 | 3/2006 | Rosenzweig et al. | |
| 7,054,481 B2 | 5/2006 | Lloyd-Jones | |
| 7,526,459 B2 | 4/2009 | Flinn et al. | |
| 7,620,902 B2 | 11/2009 | Manion et al. | |
| 7,970,240 B1 | 6/2011 | Chao et al. | |
| 8,705,897 B1 | 4/2014 | Chao et al. | |
| 8,811,775 B1 | 8/2014 | Chao et al. | |
| 9,021,045 B2 * | 4/2015 | Pennington | G06Q 10/10 709/212 |
| 2001/0015733 A1 | 8/2001 | Sklar | |
| 2001/0015756 A1 | 8/2001 | Wilcock et al. | |

(Continued)

FOREIGN PATENT DOCUMENTS

| | | |
|---|---|---|
| CN | 101438326 A | 5/2009 |
| CN | 101606039 A | 12/2009 |

(Continued)

*Primary Examiner* — Keith Bloomquist
(74) *Attorney, Agent, or Firm* — McDermott Will & Emery LLP

(57) ABSTRACT

Systems and methods for presenting social content on a map are provided. In some aspects, a method includes receiving a new content item. The new content item is not associated with a social network group comprising a set of subject members and a set of viewing members. The method also includes determining that the new content item is related to the social network group. The method also includes storing the new content item in association with the social network group. The method also includes associating the new content item with a geographic location. The method also includes providing for display a map and an indication of the social network group. The map includes a representation of the new content item. The representation of the new content item is positioned on the map proximate to the geographic location on the map.

27 Claims, 8 Drawing Sheets

(56) References Cited

U.S. PATENT DOCUMENTS

| | | |
|---|---|---|
| 2002/0049738 A1 | 4/2002 | Epstein |
| 2002/0087546 A1 | 7/2002 | Slater et al. |
| 2004/0205515 A1 | 10/2004 | Socolow et al. |
| 2007/0244925 A1 | 10/2007 | Albouze |
| 2007/0273558 A1* | 11/2007 | Smith et al. ............... 340/995.1 |
| 2009/0019085 A1* | 1/2009 | Abhyanker ............... 707/104.1 |
| 2009/0281719 A1 | 11/2009 | Jakobson |
| 2009/0282342 A1* | 11/2009 | Fabris et al. ............... 715/733 |
| 2009/0303036 A1 | 12/2009 | Sahuguet |
| 2010/0115407 A1* | 5/2010 | Kim et al. ............... 715/708 |
| 2010/0130226 A1 | 5/2010 | Arrasvuori et al. |
| 2010/0146443 A1 | 6/2010 | Zuckerberg et al. |
| 2010/0191728 A1* | 7/2010 | Reilly et al. ............... 707/736 |
| 2010/0250672 A1* | 9/2010 | Vance et al. ............... 709/204 |
| 2011/0010182 A1 | 1/2011 | Turski et al. |
| 2011/0083101 A1 | 4/2011 | Sharon et al. |
| 2011/0238762 A1* | 9/2011 | Soni et al. ............... 709/206 |
| 2011/0260860 A1* | 10/2011 | Gupta ............... 340/539.13 |
| 2011/0265011 A1 | 10/2011 | Taylor et al. |
| 2012/0027256 A1* | 2/2012 | Kiyohara ......... G06F 17/30029 382/103 |
| 2013/0031489 A1 | 1/2013 | Gubin et al. |
| 2013/0036166 A1 | 2/2013 | Dunko |
| 2013/0110927 A1 | 5/2013 | Marra et al. |
| 2013/0111354 A1 | 5/2013 | Marra et al. |
| 2014/0337324 A1 | 11/2014 | Chao et al. |

FOREIGN PATENT DOCUMENTS

| | | |
|---|---|---|
| CN | 101960826 A | 1/2011 |
| KR | 10-2010-0105637 | 9/2010 |
| WO | WO-2013/066725 A1 | 5/2013 |

* cited by examiner

DISPLAYING CONTENT ITEMS RELATED TO A SOCIAL NETWORK GROUP ON A MAP

FIELD

The subject technology generally relates to social networking software and, in particular, relates to a system and method for displaying content items related to a social network group.

BACKGROUND

Social networking services are designed, in part, to store and provide information about the social contacts of a user. Oftentimes, social network groups are provided within social networking services to provide information about a defined group of people, such as a family, members of a club, alumni of a university, etc. One purpose of social network groups is to store interesting content items about the interactions between members in the groups. For example, a family group might find the fact that two adult brothers had dinner together interesting. When displaying a webpage of a social network group, a web browser may display a plurality of content items associated with the social network group, such as photographs, videos, business reviews or articles. The plurality of content items may be arranged in an arbitrary order or a ranked order, where the ranking is based on chronology or interest level. One drawback of this scheme is that the arrangement of content items is not presented in a manner designed to optimize the interaction of the user with the content items. As the foregoing illustrates, a technique to display content about a social network group in a meaningful format may be desirable.

SUMMARY

The disclosed subject matter relates to a computer-implemented method for presenting social content on a map. The method includes receiving a new content item. The new content item is not associated with a social network group including a set of subject members and a set of viewing members. The method also includes determining that the new content item is related to the social network group. The method also includes storing the new content item in association with the social network group. The method also includes associating the new content item with a geographic location. The method also includes providing for display a map and an indication of the social network group. The map includes a representation of the new content item. The representation of the new content item is positioned on the map proximate to the geographic location on the map.

The disclosed subject matter further relates to a non-transitory computer-readable medium. The computer-readable medium includes instructions that, when executed by a computer, cause the computer to implement a method for presenting social content on a map. The instructions include code for receiving a new content item. The new content item is not associated with a social network group including a set of subject members and a set of viewing members. The instructions also include code for determining that the new content item is related to the social network group. The instructions also include code for storing the new content item in association with the social network group. The instructions also include code for associating the new content item with a geographic location. The instructions also include code for transmitting for display a map to a feed associated with the social network group. The map includes a representation of the new content item. The representation of the new content item is positioned on the map proximate to the geographic location on the map.

The disclosed subject matter further relates to a system. The system includes one or more processors. The system also includes a memory that includes instructions that, when executed by the one or more processors, cause the one or more processors to implement a method for presenting social content. The instructions include code for receiving a new content item. The new content item is not associated with a social network group. The instructions also include code for determining that the new content item is related to the social network group. The instructions also include code for storing the new content item in association with the social network group. The instructions also include code for associating the new content item with a geographic location. The instructions also include code for providing for display a map and an indication of the social network group to a feed associated with the social network group. The map includes a representation of the new content item. The representation of the new content item is positioned on the map proximate to the geographic location on the map.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is related to approaches for presenting social content on a map. One technique involves receiving a new content item, such as an image, a video, an article, a text, audio or video chat room interface, contents of a chat or messaging session, a status update, a geographic check-in or a calendar event. The new content item is not associated with a social network group that includes a set of subject members and a set of viewing members. The technique also involves determining that the new content item is related to the social network group. The new content item may be related to the social network group if the new content item is associated with at least two subject members of the social network group, for example, if two subject members are mentioned in the new content item or indicated a preference for the new content item. The technique also involves storing the new content item in association with the social network group. The technique also involves associating the new content item with a geographic location. The geographic location may be included in the new content item. For example, some photographs and videos include geographic codes indicating a geographic location. Alternatively, the geographic location may be derived based on a point of interest name included in the new content item. For example, the new content item may include a review of a business, and the geographic location may correspond to the physical address of the business. The technique also involves generating a map including the geographic location. The map includes a representation of the new content item. The representation of the new content item is positioned on the map proximate to the geographic location on the map. For example, the representation of the new content item may overlay the map at the geographic location. The technique also involves providing for display a representation of the map and an indication of the social network group. For example, the map may be displayed on a webpage of the social network group.

Figure 1:
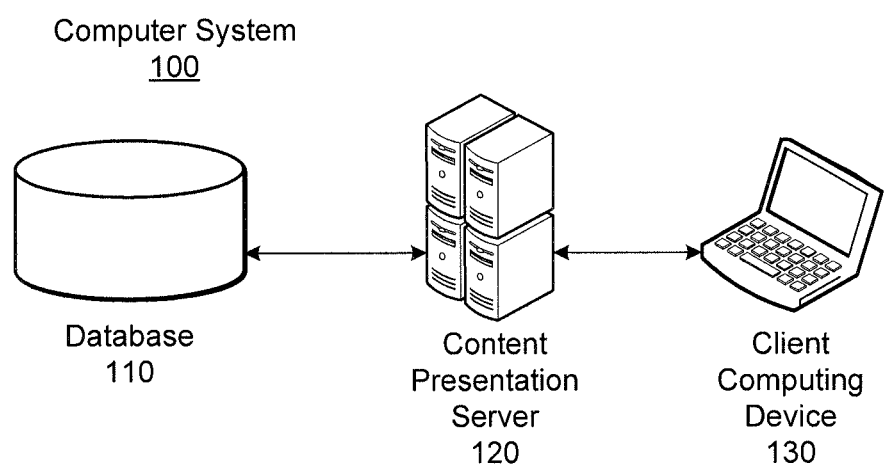
FIG. 1 illustrates an example of a computer system configured to implement displaying content items related to a social network group on a map.

FIG. 1 illustrates an example of a computer system 100 configured to implement displaying content items related to a social network group.

As shown, the computer system 100 includes a database 110, a content presentation server 120, and a client computing device 130. The database 110, content presentation server 120, and client computing device 130 may be configured to communicate with one another via a network, such as the Internet, an intranet or a cellular network or via a wired or wireless connection.

The database 110 is configured to store content or data to be presented by the content presentation server 120. The database 110 is described in more detail in conjunction with FIGS. 2-3, below. While one database 110 is illustrated here, persons skilled in the art will recognize that the techniques disclosed herein may be implemented with multiple databases 110.

The content presentation server 120 is configured to receive content from the database 110 and to provide or transmit for display the content that is received from the database 110 to the client computing device 130. The content presentation server 120 is described in more detail in conjunction with FIG. 4, below. While one content presentation server 120 is illustrated here, persons skilled in the art will recognize that the techniques disclosed herein may be implemented with multiple content presentation servers 120. Furthermore, the content presentation server 120 and the database 110 may be implemented in the same machine or in different machines.

The client computing device 130 may be any computing device capable of displaying content, such as photographs, videos, articles or comments, to a user. The client computing device 130 may be a laptop computer, a desktop computer, a mobile phone, a personal digital assistant (PDA), a tablet computer, a netbook, a physical machine or a virtual machine. Persons skilled in the art will recognize other devices that could implement the functionalities of the client computing device 130. The client computing device 130 may include one or more of a keyboard, a mouse, a touch screen, and a display to allow the user to interact with the content. Furthermore, while only one client computing device 130 is illustrated here, persons skilled in the art will recognize that the techniques disclosed herein may be implemented with multiple client computing devices 130.

Figure 2:
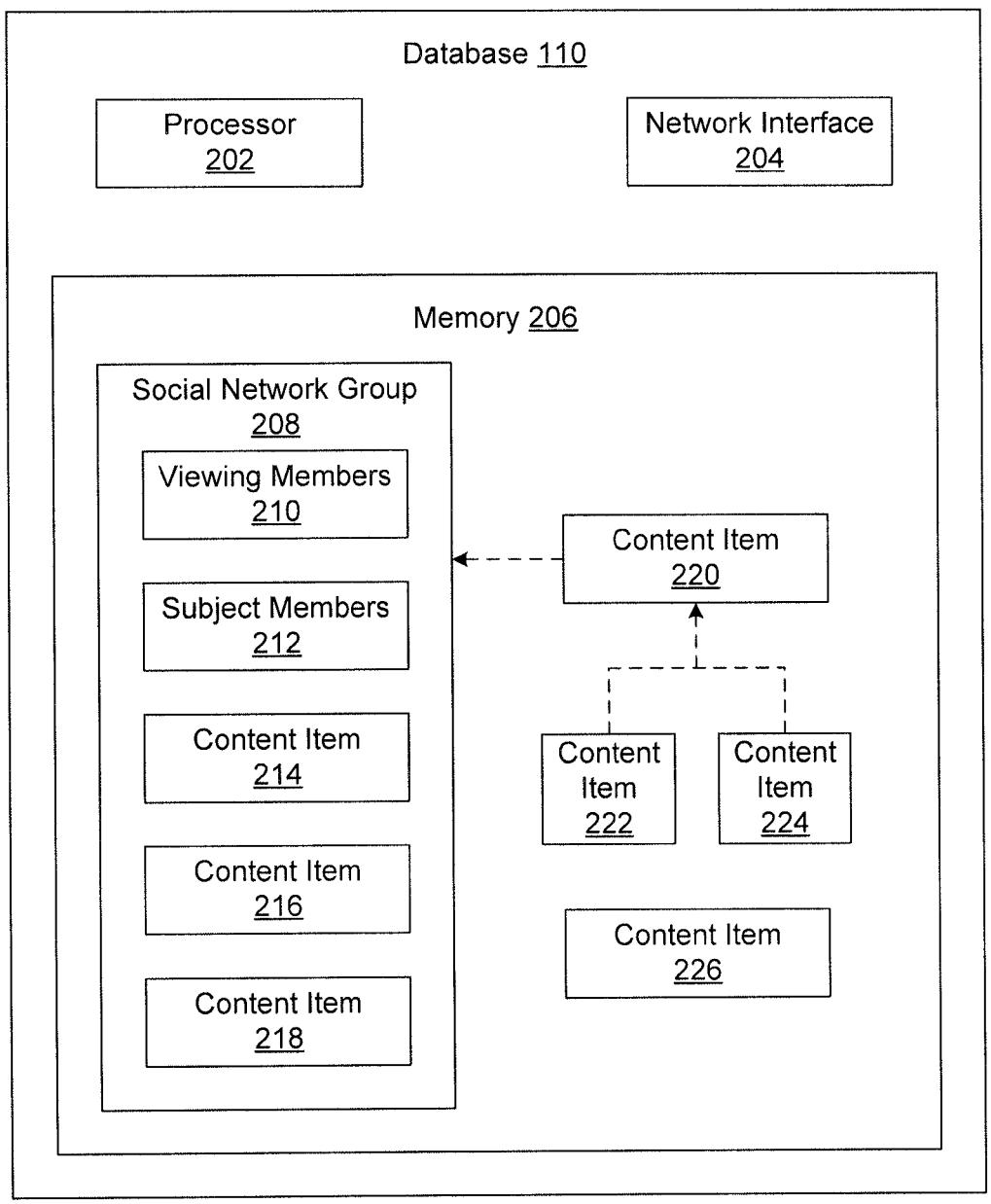
FIG. 2 illustrates an example of the database of FIG. 1 in more detail.

FIG. 2 illustrates an example of the database 110 of FIG. 1 in more detail.

As shown, the database 110 includes a processor 202, a network interface 204, and a memory 206. The processor 202 is configured to execute computer instructions that are stored in a computer-readable medium, such as the memory 206. For example, the processor 202 may be a central processing unit (CPU). The network interface 204 is configured to allow the database 110 to transmit and receive data in the network. The network interface 204 may include one or more network interface cards (NICs). The memory 206 stores data and instructions. As illustrated, the memory 206 stores information associated with one or more social network groups 208 and a plurality of content items 220, 222, 224, and 226 external to the social network group.

The information associated with the social network group 208 may include an identification of one or more viewing members 210 and an identification of one or more subject members 212. The information associated with the social network group 208 may be, for example, a symmetric social network group, an asymmetric social network group, an individual profile or a combination of two or more individual profiles. The viewing members 210 may be identical to the subject members 212. Alternatively, the set of viewing members 210 may include the set of subject members 212, meaning that all subject members 212 are also viewing members 210 but some viewing members 210 may not be subject members 212. In one example, the set of viewing members 210 may be different from the set of subject members 212 to the degree that at least one subject member 212 is not a viewing member 210. For example, a social circle may have multiple subject members 212 and single viewing member 210 who created the social circle. An individual profile may have a single subject member 212 who created the individual profile and multiple viewing members 210 who are acquaintances of the subject member 212. Symmetric social network groups, for example a family group or a university alumni group, may have identical viewing members 210 and subject members 212.

Social circles are one example of asymmetric social network groups. As used herein, "social circles" are categories to which a user can assign his/her social networking contacts and better control the distribution and visibility of social networking messages. A social circle is a social network group that may have a set of subject members 212 that includes these contacts. In accordance with the subject disclosure, a social circle is provided as a data set defining, in the set of subject members 212, a collection of contacts that are associated with one another. A social circle can be described from the perspective of an individual viewing member 212 that is the center of a particular collection of socially interconnected people, or from the aggregate perspective of a collection of socially interconnected people. A social circle can have narrowly defined boundaries, all of the members of the social circle may be familiar with one another, and permission may be required for a member to join a social circle. A user of an electronic device may define a social circle, and the social circle, as a data set defining a collection of contacts, may reflect a real-life social circle of the user. A social circle may have a single viewing member 210 and multiple subject members 212.

For example, a user of an electronic device may have different groups of friends, coworkers and family, and there may be some overlap among those groups (e.g., a coworker who is also considered to be a friend, a family member who is also a coworker). Through the creation and use of social circles, the user can organize and categorize social networking contacts into various different groupings. Other examples of social network groups may include a group of users in a computer or mobile phone-based chat session, for example, a short message service (SMS) chat session or an instant messaging (IM) chat session, an individual profile in a social networking service, or a combination of two or more individual profiles in the social networking service.

The information associated with social network group 208 may also include content items 214, 216, and 218 that are associated with the social network group and stored within the information associated with the social network group 208. Each content item 212, 216 or 218 may include one or more photographs, videos, articles, text, audio or video chat room interfaces, status updates, geographic check-ins, current locations of mobile devices or reviews of points of interest, such as businesses. Content items may be added to the information associated with the social network group 208 by one or more of the subject members 212.

Additional content items 220, 222, 224, and 226 may be stored outside the information associated with the social network group 208. The additional content items 220, 222, 224, and 226 may not be associated with the social network group.

Some content items may be associated with a geographic location that may be presented on a map. The geographic location may correspond to a geographic point of interest, such as a business or a park, situated at the geographic location. The point of interest may be derived from the geographic location or vice versa. For example, a business may correspond to a geographic location or a geographic location may correspond to a business. The geographic location may be included in the content item. For example, photographic and video content items taken by some cameras may include a geographic code that corresponds to a location.

Alternatively, the geographic location may be derived based on the content item or based on a point of interest name included in the content item. For example, if the content item is a review of a restaurant that includes the name of the restaurant, the corresponding geographic location may be the address of the restaurant, which may be stored in database 110 or another database. Some content items, for example chat rooms or photographs lacking any geographic indication, may lack a location. The content items may be provided to database 110 by users of the social networking service. Alternatively, the content items may be gathered from sources external to the database 110 using, for example, a web crawler. However, users of the social networking service may opt out of having data about the user gathered from sources external to the social networking service being brought into the social networking service. In one implementation, the user may indicate that he/she wishes to opt out of having such data brought into the social networking service by modifying his/her account settings with the social networking service.

Figure 3:
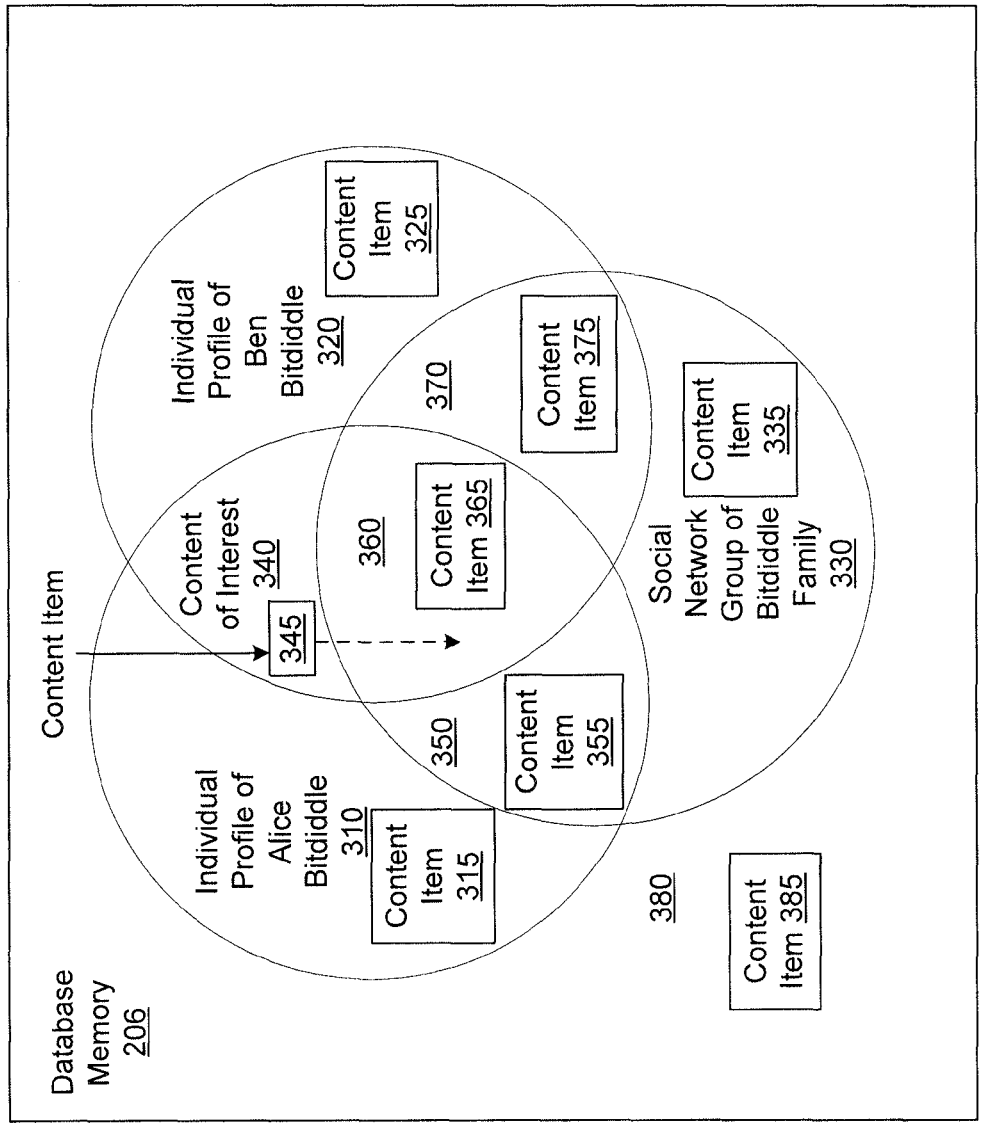
FIG. 3 illustrates an example of data that may be stored in the database memory of FIG. 2 in more detail.

FIG. 3 illustrates an example of data that may be stored in the database memory 206 of FIG. 2 in more detail.

As shown, the database memory 206 includes an "individual profile of Alice Bitdiddle" 310, an "individual profile of Ben Bitdiddle" 320, and a "social network group of the Bitdiddle family" 330, all of which are associated with a social networking service. Alice Bitdiddle and Ben Bitdiddle are the only subject members 212 and the only viewing members 210 of the Bitdiddle family social network group 330. In addition, the user Alice Bitdiddle has permission to view one or more content items 325 in the individual profile of Ben Bitdiddle 320, and the user Ben Bitdiddle has permission to view one or more content items 315 in the individual profile of Alice Bitdiddle 310. The individual profiles of Alice Bitdiddle 310 and Ben Bitdiddle 320, as well as the social network group of the Bitdiddle family 330 include content items, for example content items 315, 325, and 335. Some contents items 315 within Alice Bitdiddle's profile 310 are associated with the individual profile of Alice Bitdiddle 310 only. Some content items 325 within Ben Bitdiddle's profile 320 are associated with the individual profile of Ben Bitdiddle 320 only. Some content items 335 within the Bitdiddle family social network group 330 are associated with the social network group of the Bitdiddle family 330 only.

Content items 345 within region 340 are associated with the individual profiles of both Alice Bitdiddle 310 and Ben Bitdiddle 320. As region 340 includes information about both Alice Bitdiddle and Ben Bitdiddle, content items 345 in region 340 are interesting for the Bitdiddle family social network group 330. Thus, content items 345 in region 340 might be automatically brought into the Bitdiddle family social network group 330. However, it should be noted that either Alice Bitdiddle or Ben Bitdiddle may opt out of having their content items 345 automatically brought into the Bitdiddle family social network group 330. The content presentation server 120 may ensure that any other user associated with a content item 345 approves the content item being added to the social network group 330. If a user other than Alice Bitdiddle or Ben Bitdiddle is associated with one or more content item 365 items that are to be automatically brought into the Bitdiddle family social network group, the other user may also opt out of having the content items automatically brought into the Bitdiddle family social network group 330.

Content items 365 in region 360 are associated with all of Alice Bitdiddle's profile 310, Ben Bitdiddle's profile 320, and the Bitdiddle family group 330. Content items 355 in region 350 are associated with Alice's profile 310 and the Bitdiddle family profile 330. Content items 375 in region 370 are associated with Ben's profile 320 and the Bitdiddle family profile 330. Content items 385 in region 380 are associated with neither Alice's profile 310, nor Ben's profile 320, nor the Bitdiddle family profile 330.

Figure 4:
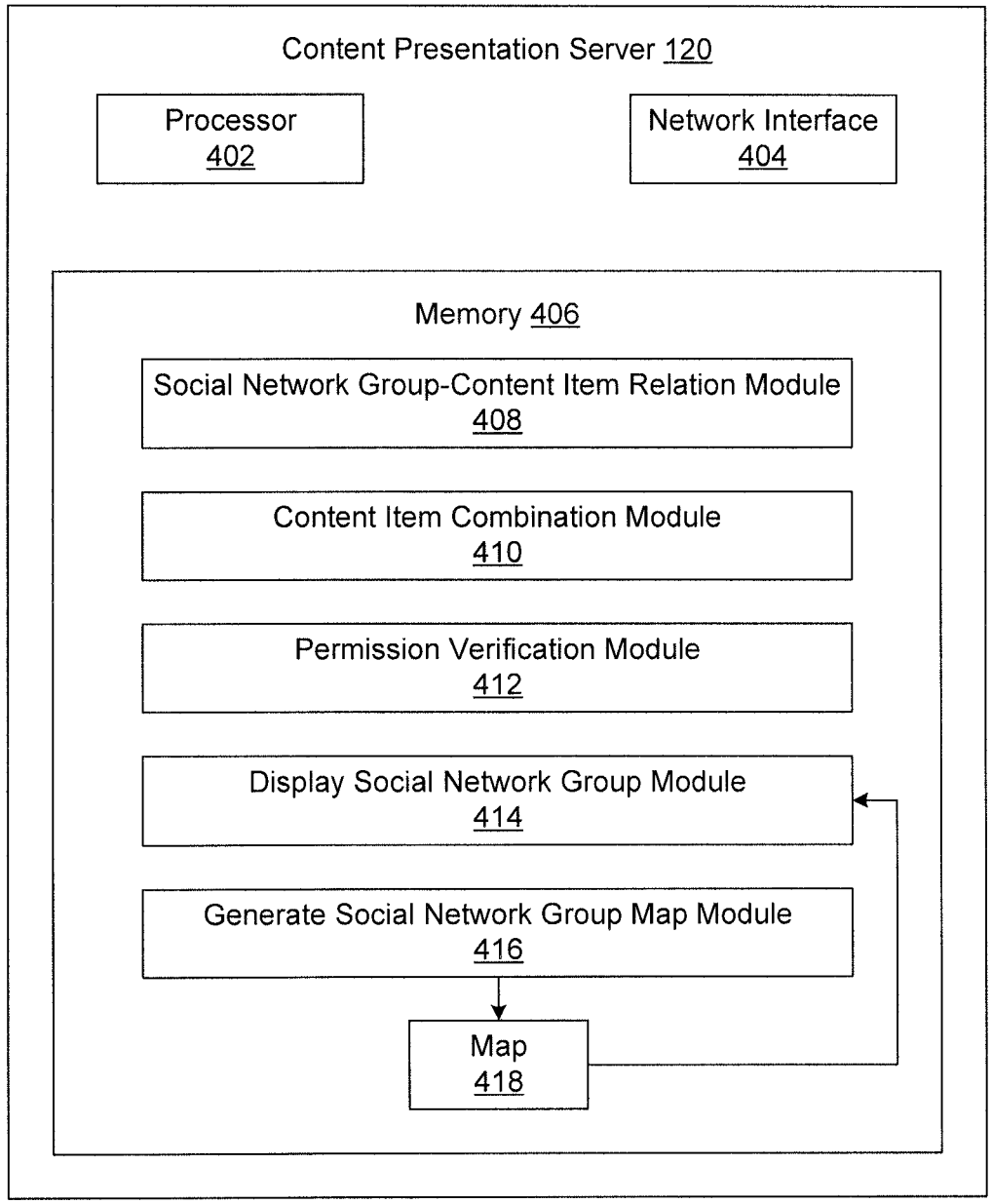
FIG. 4 illustrates an example of the content presentation server of FIG. 1 in more detail.

FIG. 4 illustrates an example of the content presentation server 120 of FIG. 1 in more detail.

As shown, the content presentation server 120 includes a processor 402, a network interface 404, and a memory 406. The processor 402 is configured to execute computer instructions that are stored in a computer-readable medium, such as the memory 406. For example, the processor 402 may be a central processing unit (CPU). The network interface 404 is configured to allow the content presentation server 120 to transmit and receive data in the network. The network interface 404 may include one or more network interface cards (NICs). The memory 406 stores data and instructions. As illustrated, the memory 406 stores a "social network group-content item relation module" 408, a "content item combination module" 410, a "permission verification module" 412, a "display social network group module" 414, a "generate social network group map module" 416, and a map 418.

The "social network group-content item relation module" 408 is configured to determine that a new content item that, initially, is not associated with a social network group could be associated with the social network group and to associate the new content item with the social network group. The social network group-content item relation module 408 may operate by receiving the new content item not associated with the social network group and determining that the new content item is related to the social network group. The new content item may be related to the social network group if the new content item is associated with at least two subject members of the social network group or at least a certain proportion of the subject members of the social network group. The new content item may be associated with one or more subject members, for example, the one or more subject members may have the content item on their individual profiles or the one or more subject members may comment, prefer or otherwise indicate an interest in the new content item, or the one or more subject members may be named in the new content item.

The "content item combination module" 410 is configured to combine two or more related content items, e.g., the two content items 222 and 224, into a single content item, e.g., content item 220. The content item combination module 410 may determine, for example, that a first content item is related to a second content item, and that the combination of the first content item and the second content item is related to a social network group. Content items may be related to one another if the posters of the content items, or others associated with the content items, are both subject member of the social network group and the content items are associated with the same geographic point of interest and are proximate in time, thereby indicating that the some of the subject members may have interacted with the same geographic point of interest at the same time. For example, if two subject members of the social network group indicate that they are at the same restaurant at approximately the same time, the content item combination module 410 may conclude that the two members were at the restaurant together and create a new content item indicating this information. The new content item created by the content item combination module 410 may include an indication of each content item from which the new content item was generated. When the content item combination module 410 combines a first content item and a second content item into a new content item, the set of users who have permission to view the new content item may include the intersection of the set of users who have permission to view the first content item and the set of users who have permission to view the second content item. A user of the social networking service may opt out from having new content items generated based on the content items associated with the user.

The "permission verification module" 412 is configured to determine if a requesting user who requests to view a content item has permission to view the content item. The permission verification module 412 may ensure that a set of users who have permission to view a content item that is added to a social network group by either the social network group-content item relation module 408 or the content item combination module 410 includes the viewing members of the social network group. A user posting a new content item may set the permission for other users to view the new content item. The user may allow all users to view the new content item or only members of certain social network groups or social circles to view the new content item.

The "display social network group module" 414 is configured to cause information associated with a social network group 208 to be provided or transmitted for display. The information may be provided or transmitted in response to a request from a requestor to view the information associated with the social network group. Alternatively, the information may be stored in a feed associated with the social network group, which my be accessible to a viewing member of the social network group. The display social network group module 414 may provide or transmit map 418 for display on the client computing device 130 of the requestor. In responding to a request from the requestor to view the information associated with social network group 208, the display social network group module 414 may determine that the requestor is a viewing member of the social network group and, if so, store or transmit for display a representation of a map 418 including one or more of the content items 214, 216 or 218 associated with the social network group and an indication of the social network group, such as a name, a title, or an image associated with the social network group. If at least one of the content items 214, 216 or 218 lacks a geographic location or has a geographic location that is not within the displayed geographic region of the representation of the map 418 on the client computing device 130, then the at least one of the content items 214, 216 or 218 may be displayed externally to the map 418. The display social network group module 414 may further determine that the requestor has permission to view the content items 214, 216 or 218 that are provided for display on or off the map 418.

The "generate social network group map module" 416 is configured to generate the map 418 associated with the social network group. The generate social network group map module 416 may operate by associating the content items provided to the generate social network group map module with geographic locations and generating a map 418 including some of the geographic locations. The map 418 may include representations of the content items associated with the social network group positioned on the map 418 proximate to the geographic locations on the map.

In one example, the map 418 may be a map of the State of California, and the content items associated with the social network group may include a photograph taken in Los Angeles, a video taken in San Francisco, a video chat room with an ongoing chat session, and a geographic check-in of a subject member of the social network group in London, England. The map 418 may include a thumbnail of photograph content item taken in Los Angeles overlaying Los Angeles and a thumbnail of a scene in the video content item taken in San Francisco overlaying San Francisco. The video chat room content item may be presented externally to the map, as the video chat room content item lacks a geographic location. The geographic check-in content item in London cannot be represented within the displayed geographic region of the map 418. Thus, the geographic check-in content item may be presented externally to the map 418.

Figure 5:
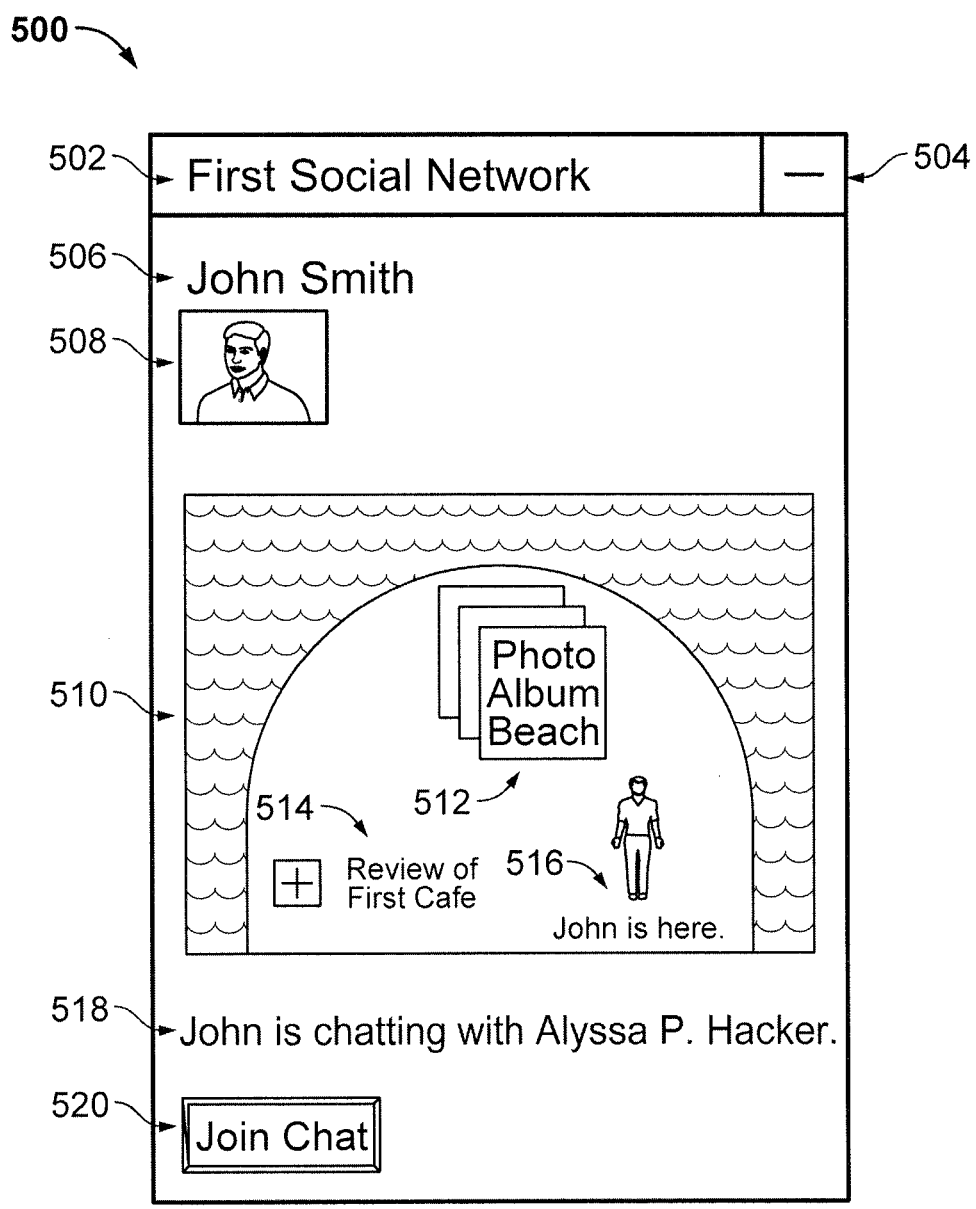
FIG. 5 illustrates a web browser window presenting an example webpage configured to implement displaying content items related to a social network group on a map.

FIG. 5 illustrates a web browser window 500 presenting a webpage configured to implement displaying content items related to a social network group on a map.

As shown, the web browser window 500 includes a title bar 502, a close button 504, a "social network group title" 506, a "social network group photograph" 508, a representation of a map 510, a representation of a content item 518 outside the map 510, and an interaction button 520 for the content item 518 outside the map 510.

The title bar 502 is typically located at the top of the web browser window 500 and may include the title of the webpage, for example the name of the social networking service, "First Social Network."

The close button 504 is configured to close the web browser window when clicked.

The "social network group title" 506 may include the title of the social network group. As illustrated, the title "John Smith" may indicate that the individual profile of John Smith is being presented.

The "social network group photograph" 508 includes a primary photograph associated with the social network group. The photograph 508 may be an image that includes one or more members of the social network group. As shown, the photograph 508 is an image of John Smith.

The representation of the map 510 may include one or more content items 512, 514, and 516, that may be associated with a geographic location in the displayed geographic region of the map. As shown, the map 510 includes a peninsula. Content item 512, "photo album beach," is associated with a geographic location near the northern end of the peninsula. The geographic location of content item 512 may be the location where the photographs in "photo album beach" were taken. Content item 514 is a "review of First Café." The geographic location of content item 514 may correspond to the street address of First Café, which may be determined from the content item 514, from other data stored in database 110 or from an external database. Content item 516 indicates John's present location. The content presentation server 120 may determine John's location by receiving the location from a mobile device, for example client computing device 130, that belongs to John. However, John or any other user of the social networking service may opt out of having his mobile device transmit its location to the content presentation server 120 or of having his current location displayed on the webpage.

Content item 518 is a chat room that may not correspond to any geographic location. As a result, content item 518 is presented in the webpage outside the map 510. Interaction button 520 allows a viewer of the webpage to interact with content item 518, for example, by joining a chat session. In one implementation, (not illustrated) content items having a geographic location outside the displayed geographic region on the map 518 may also be presented on the webpage outside the map. Either a full content item or a representation of the content item, such as a thumbnail or a blurb, may be presented.

In one implementation, the web browser window 500 may further include an input for receiving a time range (not illustrated). The input for receiving a time range may include a text box for the user to enter a start date and an end date or one or more scroll bars with which a user may select a start time and an end time by operating a cursor. One scroll bar may be provided for selecting the start time and another scroll bar may be provided for selecting the end time. Alternatively, a single scroll bar with an adjustable length or width scroll thumb may be used for selecting both the start time and the end time. One end of the scroll thumb may represent the start time and another end of the scroll thumb may represent the end time.

One or more of the content items 512, 514 or 516 on the map may be associated with a time. For example, image and video content items may be associated with times that the image or video content items were taken and article content items may be associated with the publication times of the article content items. Alternatively, content items may be associated with times that the content items were posted to the social networking service. Content items that are associated with a time within the time range selected by the user may be displayed on the map, while content items that are associated with a time outside the time range selected by the user may not be displayed or may be displayed externally to the map.

Figure 6:
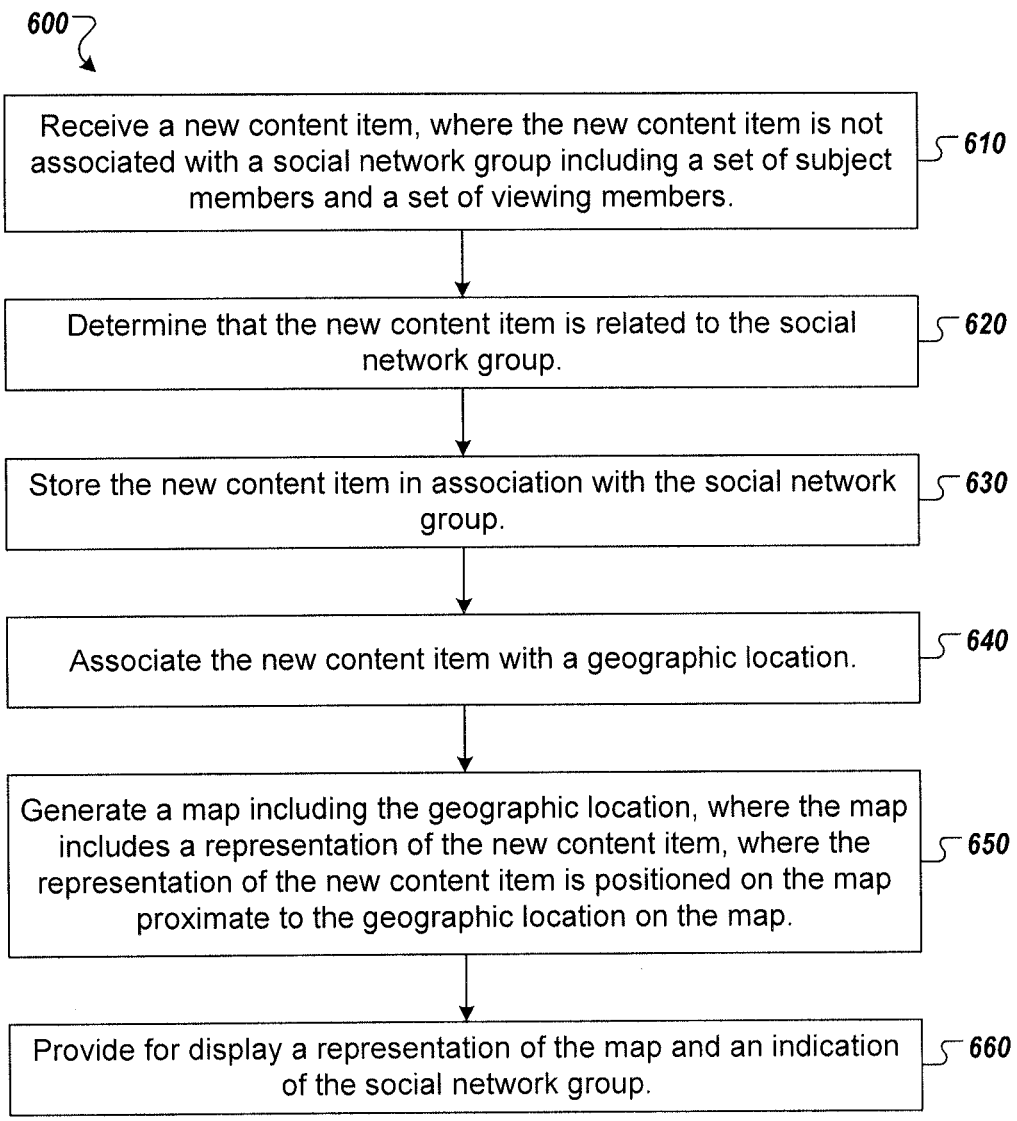
FIG. 6 illustrates an example process by which a content item related to a social network group may be displayed on a map.

FIG. 6 illustrates a process 600 by which a content item related to a social network group may be displayed on a map 418.

The process 600 begins at step 610, where the content presentation server 120 receives a new content item 220 that is not associated with a social network group. The information associated with the social network group may include a set of subject members and a set of viewing members. The new content item may be one or more of a photograph, a video, an article, a text, audio or video chat room, a status update, a geographic check-in or a calendar event. The social network group may include a single individual profile, a combination of two or more individual profiles, a social circle or a symmetric social network group, for example, if the content item is associated with at least 20% of the subject members of the social network group.

According to step 620, the content presentation server 120 determines that the new content item is related to the social network group. The new content item may be related to the social network group if the new content item is associated with at least two subject members of the social network group or if the new content item is associated with at least a certain proportion or percentage of the subject members of the social network group.

According to step 630, the content presentation server 120 stores the new content item in association with the social network group. In one example, the content presentation server 120 may determine that all viewing members of the social network group have permission to view the new content item and store the new content item in association with the social network group only if all of the viewing members have permission to view the new content item.

The content presentation server 120 may then receive a request to display the social network group from a client computing device 130 belonging to a requestor. The content presentation server may determine that the requestor is a viewing member 210 of the social network group and that the requestor has permission to view the new content item 220.

According to step 640, the content presentation server 120 associates the new content item with a geographic location. The new content item may include a geographic location. For example, a photograph, video or check-in may be coupled with a geographic code that indicates the geographic location. Alternatively, the content presentation server 120 may derive the geographic location based on a point of interest name included in the new content item. For example, the new content item may be a review of a business, and the content presentation server 120 may associate the new content item with the address of the business, which may be determined through the database 110 or another database. A poster of the new content item may opt out of having the new content item associated with any data or addresses from outside the new content item.

According to step 650, the content presentation server 120 generates a map including the geographic location. The map may include a representation of the new content item, which may be positioned on the map proximate to the geographic location on the map. For example, the representation of the new content item may overlay the map at the geographic location.

According to step 660, the content presentation server 120 provides for display a representation of the map and an indication of the social network group, such as a name, a title, or an image associated with the social network group. The content presentation server 120 may then transmit the representation of the map and the indication of the social network group to the client computing device for display. After step 660, the process 600 ends.

Figure 7:
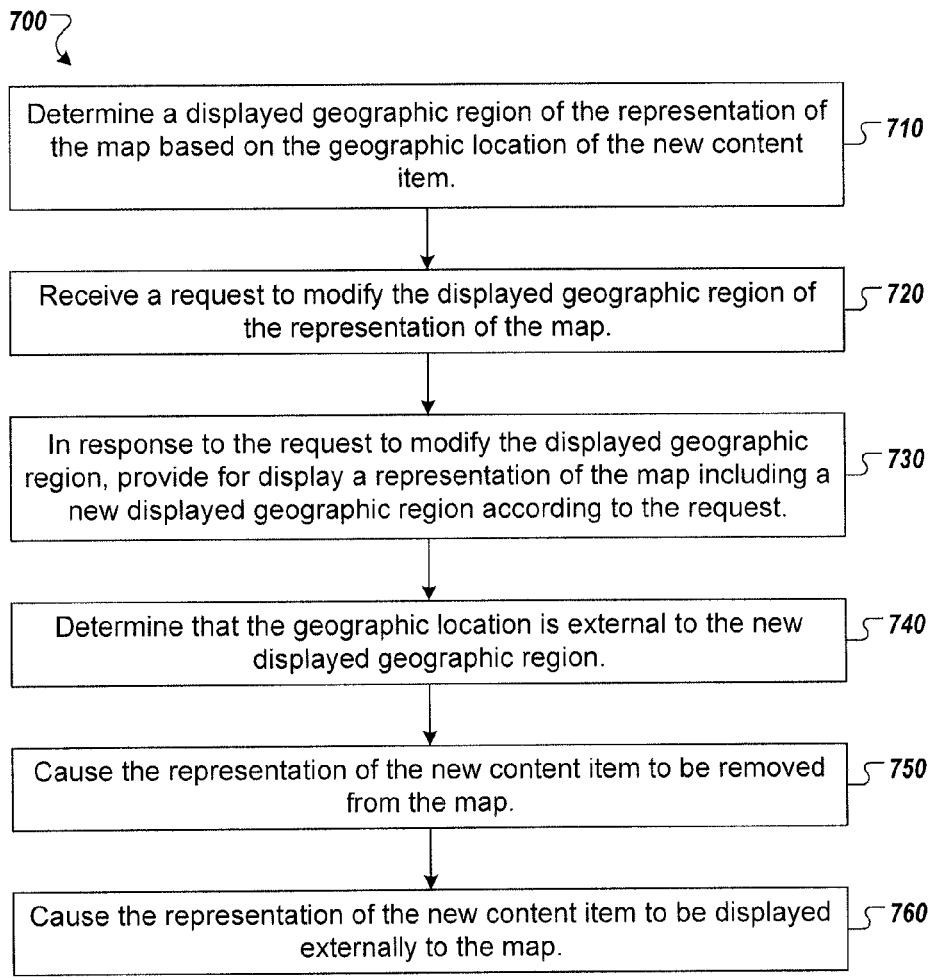
FIG. 7 illustrates an example process by which a displayed geographic region of a map displaying content items related to a social network group may be modified.

FIG. 7 illustrates a process by which a displayed geographic region of a map displaying content items related to a social network group may be modified.

The process 700 begins at step 710, where the content presentation server 120 determines a displayed geographic region of the representation of the map based on the geographic location of the new content item. The geographic region of the representation of the map 418 may be based on all of the content items to be displayed. The geographic region may include the locations all of the content items, at least a certain proportion or percentage of the content items, or at least one of the content items.

According to step 720, the content presentation server 120 receives a request to modify the displayed geographic region of the representation of the map. The request to modify the displayed geographic region may include, for example, a request to pan, zoom in or zoom out the map.

According to step 730, the content presentation server 120, in response to the request to modify the displayed geographic region, provides for display a representation of the map including a new displayed geographic region according to the request. For example, the content presentation server 120 may cause the map to be panned, zoomed in or zoomed out according to the request. The data provided for display may be transmitted to the client computing device 130.

According to step 740, the content presentation server 120 determines that the geographic location of the new content item is external to the new displayed geographic region, as modified by the request. For example, a zoom in request to the center of the map may cause the geographic location of the new content item to be external to the new displayed geographic region if the geographic location is located close to an edge of the map.

According to step 750, the content presentation server 120 causes the representation of the new content item to be removed from the map. As a result, the representation of the new content item on the screen of the client computing device 130 may appear externally to the map.

According to step 760, the content presentation server 120 causes the representation of the new content item to be displayed externally to the map.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 8:
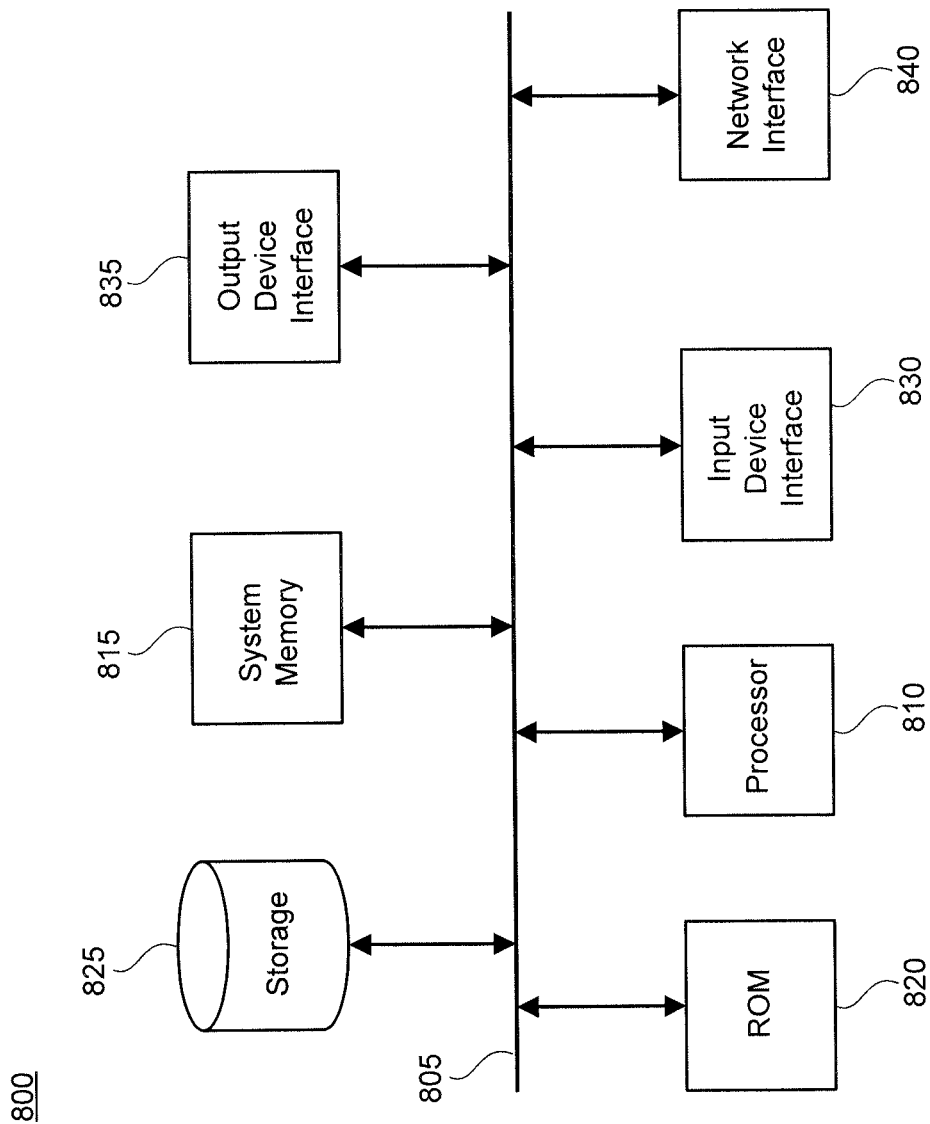
FIG. 8 conceptually illustrates an electronic system with which some implementations of the subject technology are implemented.

FIG. 8 conceptually illustrates an electronic system 800 with which some implementations of the subject technology are implemented. For example, one or more of the database 110, the content presentation server 120, or the client computing device 130 may be implemented using the arrangement of the electronic system 800. The electronic system 800 can be a computer, phone, PDA, or any other sort of electronic device. Such an electronic system includes various types of computer readable media and interfaces for various other types of computer readable media. Electronic system 800 includes a bus 805, processing unit(s) 810, a system memory 815, a read-only memory 820, a permanent storage device 825, an input device interface 830, an output device interface 835, and a network interface 840.

The bus 805 collectively represents all system, peripheral, and chipset buses that communicatively connect the numerous internal devices of the electronic system 800. For instance, the bus 805 communicatively connects the processing unit(s) 810 with the read-only memory 820, the system memory 815, and the permanent storage device 825.

From these various memory units, the processing unit(s) 810 retrieves instructions to execute and data to process in order to execute the processes of the subject technology. The processing unit(s) can be a single processor or a multi-core processor in different implementations.

The read-only-memory (ROM) 820 stores static data and instructions that are needed by the processing unit(s) 810 and other modules of the electronic system. The permanent storage device 825, on the other hand, is a read-and-write memory device. This device is a non-volatile memory unit that stores instructions and data even when the electronic system 800 is off. Some implementations of the subject technology use a mass-storage device (such as a magnetic or optical disk and its corresponding disk drive) as the permanent storage device 825.

Other implementations use a removable storage device (such as a floppy disk, flash drive, and its corresponding disk drive) as the permanent storage device 825. Like the permanent storage device 825, the system memory 815 is a read-and-write memory device. However, unlike storage device 825, the system memory 815 is a volatile read-and-write memory, such a random access memory. The system memory 815 stores some of the instructions and data that the processor needs at runtime. In some implementations, the processes of the subject technology are stored in the system memory 815, the permanent storage device 825, and/or the read-only memory 820. For example, the various memory units include instructions for displaying content items related to a social network group on a map, in accordance with some implementations. From these various memory units, the processing unit(s) 810 retrieves instructions to execute and data to process in order to execute the processes of some implementations.

The bus 805 also connects to the input and output device interfaces 830 and 835. The input device interface 830 enables the user to communicate information and select commands to the electronic system. Input devices used with input device interface 830 include, for example, alphanumeric keyboards and pointing devices (also called "cursor control devices"). Output device interfaces 835 enables, for example, the display of images generated by the electronic system 800. Output devices used with output device interface 835 include, for example, printers and display devices, such as cathode ray tubes (CRT) or liquid crystal displays (LCD). Some implementations include devices such as a touchscreen that functions as both input and output devices.

Finally, as shown in FIG. 8, bus 805 also couples electronic system 800 to a network (not shown) through a network interface 840. In this manner, the electronic system 800 can be a part of a network of computers (such as a local area network ("LAN"), a wide area network ("WAN"), or an Intranet, or a network of networks, such as the Internet. Any or all components of electronic system 800 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for presenting social content on a map, the method comprising:
    creating a new content item by combining a plurality of content items into a single content item, the plurality of content items being associated with a common geographic location, wherein the new content item comprises an indication of each of the plurality of content items combined to create the new content item, and wherein the social network group is a predefined group of contacts in a social networking service;
    determining a set of users of the social networking service having permission to view the new content item, wherein the set of users includes an intersection of users of the social networking service having permission to view the plurality of content items;
    determining that the new content item is related to the social network group comprising a set of subject members and a set of viewing members, wherein determining that the new content item is related to the social network group comprises determining that at least one content item among the plurality of content items is associated with profiles of at least two subject members of the social network group;
    storing the new content item in association with the social network group; and
    providing for display, to one or more users in the set of users of the social networking service having permission to view the new content item, a map and an indication of the social network group, wherein the map includes a representation of the new content item, wherein the representation of the new content item is positioned on the map proximate to the geographic location on the map.

2. The method of claim 1, wherein the indication of the social network group comprises a name associated with the social network group or an image associated with the social network group.

3. The method of claim 1, wherein the new content item includes a collection of the plurality of content items, each content item including one or more of a photograph, a video, a geographic check-in, a current location of a mobile device, a review of a point of interest, or a calendar event.

4. The method of claim 1, wherein the social network group comprises one or more of: a group of users in a computer or mobile phone-based chat session, a social circle, an individual profile in a social networking service or a combination of two individual profiles in the social networking service.

5. The method of claim 1, further comprising:
    determining that a plurality of the viewing members of the social network group have permission to view the new content item.

6. The method of claim 1, further comprising determining a displayed geographic region of the representation of the map based on the geographic location.

7. The method of claim 6, further comprising:
    receiving a request to modify the displayed geographic region of the representation of the map; and
    in response to the request to modify the displayed geographic region, providing for display a representation of the map comprising a new displayed geographic region according to the request.

8. The method of claim 7, wherein the request to modify the displayed geographic region comprises a request to pan, zoom in or zoom out the map.

9. The method of claim 7, further comprising:
    determining that the geographic location is external to the new displayed geographic region; and
    causing the representation of the new content item to be removed from the map.

10. The method of claim 9, further comprising:
    causing the representation of the new content item to be displayed externally to the map.

11. The method of claim 1, further comprising:
    receiving a time range;
    determining a time associated with the new content item;
    if the time associated with the new content item is within the time range, causing the representation of the new content item to be maintained on the map; and if the time associated with the new content item is not within the time range, causing the representation of the new content item to be removed from the map and displayed external to the map.

12. The method of claim 1, wherein the plurality of content items are associated with a common time period.

13. The method of claim 1, wherein the set of users of the social networking service having permission to view the new content item is identical to the intersection of the sets of users of the social networking service having permission to view the plurality of content items.

14. The method of claim 1, wherein each of the profiles provides information associated with a respective subject member of the set of subject members, including one or more content items previously received in association with the respective subject member.

15. The method of claim 14, wherein the plurality of content items is associated with profiles of at least two subject members of the social network group when at least one content item among the plurality of content items is included within profiles of at least two subject members of the social network group.

16. A non-transitory computer-readable medium comprising instructions that, when executed by a computer, cause the computer to:
create a new content item by combining a plurality of content items into a single content item, the plurality of content items being associated with a common geographic location, wherein the new content item comprises an indication of each of the plurality of content items combined to create the new content item, and wherein the social network group is a predefined group of contacts in a social networking service;
determine a set of users of the social networking service having permission to view the new content item, wherein the set of users includes an intersection of users of the social networking service having permission to view the plurality of content items;
determine that the new content item is related to the social network group comprising a set of subject members and a set of viewing members, wherein the determination that the new content item is related to the social network group comprises determining that at least one content item among the plurality of content items is associated with profiles of at least two subject members of the social network group;
store the new content item in association with the social network group; and
transmit for display, to one or more users in the set of users of the social networking service having permission to view the new content item, a map to a feed associated with the social network group, wherein the map includes a representation of the new content item, wherein the representation of the new content item is positioned on the map proximate to the geographic location on the map.

17. The non-transitory computer-readable medium of claim 16, wherein the set of viewing members of the social network group comprises the set of subject members of the social network group.

18. The non-transitory computer-readable medium of claim 17, wherein the set of viewing members of the social network group is identical to the set of subject members of the social network group.

19. The non-transitory computer-readable medium of claim 16, wherein at least one subject member of the social network group is not a viewing member of the social network group.

20. The non-transitory computer-readable medium of claim 16 further comprising instructions that, when executed by a computer, cause the computer to:
determine a displayed geographic region of the representation of the map based on the geographic location.

21. The non-transitory computer-readable medium of claim 20, further comprising instructions that, when executed by the computer, cause the computer to:
receive a request to modify the displayed geographic region of the representation of the map; and
in response to the request to modify the displayed geographic region, transmit for display a representation of the map comprising a new displayed geographic region modified according to the request.

22. The non-transitory computer-readable medium of claim 21, wherein the request to modify the displayed geographic region of the representation of the map comprises a request to pan, zoom in or zoom out the map.

23. The non-transitory computer-readable medium of claim 21, further comprising instructions that, when executed by the computer, cause the computer to:
determine that the geographic location is external to the new displayed geographic region; and
cause the representation of the new content item to be removed from the map.

24. The non-transitory computer-readable medium of claim 23, further comprising instructions that, when executed by the computer, cause the computer to:
cause the representation of the new content item to be displayed externally to the map.

25. A system comprising:
one or more processors; and
a memory comprising instructions that, when executed by the one or more processors, cause the one or more processors to:
create a new content item by combining a plurality of content items into a single content item, the plurality of content items being associated with a common geographic location, wherein the new content item comprises an indication of each of the plurality of content items combined to create the new content item, and wherein the social network group is a predefined group of contacts in a social networking service;
determine a set of users of the social networking service having permission to view the new content item, where the set of users includes an intersection of sets of users of the social networking service having permission to view the plurality of content items;
determine that the new content item is related to the social network group,
wherein the determination that the new content item is related to the social network group comprises determining that at least one content item among the plurality of content items is associated with profiles of at least two subject members of the social network group;
store the new content item in association with the social network group; and
provide for display, to one or more users in the set of users of the social networking service having permission to view the new content item, a map and an indication of the social network group to a feed associated with the social network group, wherein the map includes a representation of the new content item, wherein the representation of the new content item is positioned on the map proximate to the geographic location on the map.

26. The system of claim 25, wherein the new content item comprises the geographic location.

27. The system of claim 25, wherein the memory further comprises instructions that, when executed by the one or more processors, cause the one or more processors to:

derive the geographic location based on a point of interest name included in the new content item.

* * * * *